United States Patent [19]

Gao

[11] Patent Number: 5,114,099

[45] Date of Patent: May 19, 1992

[54] SURFACE FOR LOW DRAG IN TURBULENT FLOW

[75] Inventor: Ge Gao, Boca Raton, Fla.

[73] Assignee: W. L. Chow, Boca Raton, Fla.

[21] Appl. No.: 532,864

[22] Filed: Jun. 4, 1990

[51] Int. Cl.$^5$ ............................................. B64C 21/10
[52] U.S. Cl. .................................... 244/130; 244/200
[58] Field of Search ...................... 244/130, 207, 200; 428/167

[56] References Cited

U.S. PATENT DOCUMENTS

| | | |
|---|---|---|
| 1,454,479 | 5/1923 | McCullough . |
| 1,726,882 | 9/1929 | Boerner . |
| 2,608,171 | 8/1952 | Pearce . |
| 2,800,291 | 7/1957 | Stephens . |
| 2,899,150 | 8/1959 | Ellis, Jr. . |
| 3,184,184 | 5/1965 | Dorman et al. . |
| 3,213,819 | 10/1965 | May . |
| 4,284,302 | 8/1981 | Drews .................................. 296/185 |
| 4,354,648 | 10/1982 | Schenk et al. ...................... 244/199 |
| 4,434,957 | 3/1984 | Moritz ................................ 244/35 R |
| 4,650,138 | 3/1987 | Grose .................................. 244/130 |
| 4,750,693 | 1/1988 | Löbert . |
| 4,753,401 | 6/1988 | Bechert .............................. 244/130 |
| 4,789,117 | 12/1988 | Paterson et al. ................... 244/130 |
| 4,907,765 | 3/1990 | Hirschel et al. ................... 244/200 |

FOREIGN PATENT DOCUMENTS 3609541 9/1987 Fed. Rep. of Germany ...... 244/130

OTHER PUBLICATIONS

NASA Tech Briefs, Summer 1980, "Grooves Reduce Aircraft Drag," M. J. Walsh, Langley Research Center, p. 192.

Gao, Ge, "On Perturbation Equation of Navier-Stokes Equation", Journal of Aerospace Power, vol. 4, No. 2, pp. 189-192 (Apr. 1989).

Primary Examiner—Joseph F. Peters, Jr.
Assistant Examiner—Carla Mattix
Attorney, Agent, or Firm—Harry W. Barron

[57] ABSTRACT

A nonsmooth surface of an object in a fluid flowstream permits a reduction of turbulent drag. The surface shape is designed to approximate a minimal surface and satisfies the equation $(\bar{V}\cdot\nabla)\nabla\Phi=0$, where $\bar{V}$ is the relative velocity between the fluid and the surface, $\nabla\Phi$ is the velocity of the strain tensor. The improved surface shape may be an array of diamond shaped elements having an airfoil like diagonal along the streamline, or it may be a series of wavelets juxtaposed to one another. The specific shape of the various types of elements to be used on the surface is selected based upon the acceleration or deceleration of the fluid at the particular position on the surface, as well as the intensity of the turbulence at that position.

36 Claims, 2 Drawing Sheets

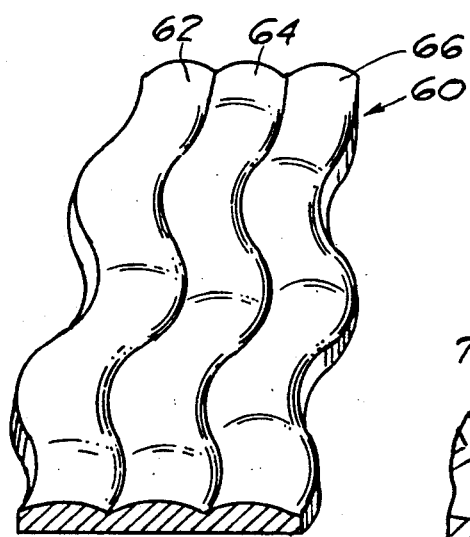
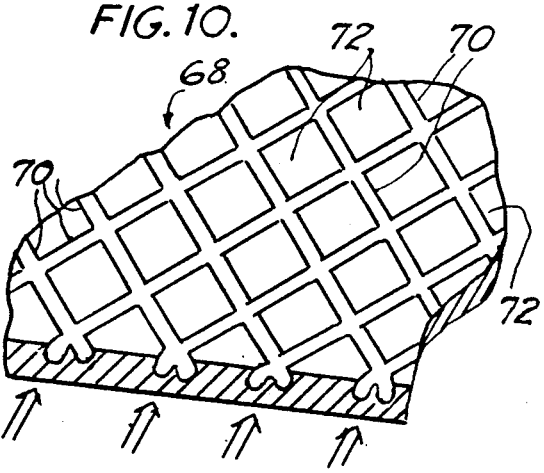
FIG. 9.
FIG. 10.
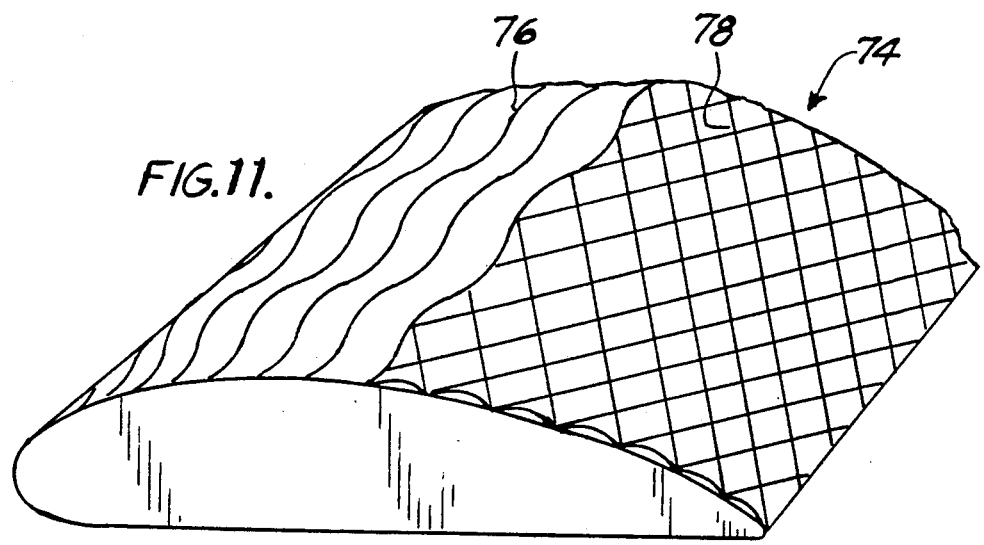
FIG. 11.
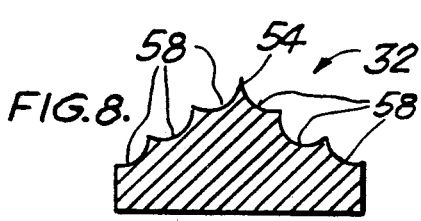
FIG. 8.
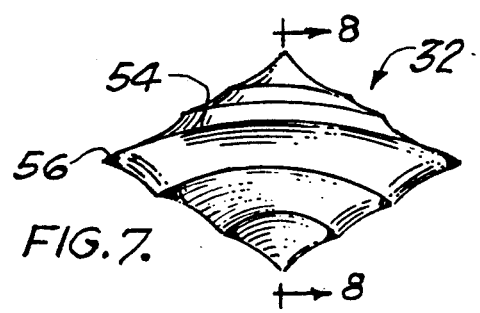
FIG. 7.

SURFACE FOR LOW DRAG IN TURBULENT FLOW

BACKGROUND OF THE INVENTION

1. Field Of The Invention

This invention relates to a low drag surfaces for use in flowing fluids, and more particularly, to such surfaces having a contoured surface specifically designed to reduce drag compared to the drag associated with a corresponding smooth surface.

Many surfaces are designed to be placed in a flowing fluid. For example, airplanes, boats, compressor blades and many other objects are specifically designed to have a low drag when there is relative flow between that object and the environmental fluid in which it operates. In all cases, the drag relates to the viscosity of the fluid and the relative velocity of the fluid with respect to the object. Drag, is a force in the direction of the relative fluid flow and opposite to the relative motion of the object, that causes either a limited velocity for a constant force or the need for additional force to be provided to overcome the effects of the drag and maintain a desired velocity.

2. Description Of The Prior Art

In the past, designers of objects, which are designed to operate in a flowing fluid environment, have attempted to make the surface as smooth as possible in order to reduce the drag. For example, rivets used in airplanes and submarines to hold the skin covering the structural supports are normally ground to mate as evenly as possible with the surrounding surfaces of the skin.

However, in the past, several others have suggested modifying the generally smooth surfaces of members subject to fluid flow in order to reduce drag, or for other similar reasons. For example, reference is made to U.S. Pat. No. 1,454,479 in the name of D. R. McCullough and entitled, "Airplane", where small Vee shaped projections along the streamline are described for the purpose of providing additional lifting capability for the airplane. However, the McCullough structure results in a vortex behind each extension and thereby has a net effect of increasing the drag. In U.S. Pat. No. 1,726,882, in the name of A. Boerner and entitled, "Means For Overcoming Fluid Friction", small openings in the body of an airplane or ship are provided to permit fluid to pass therethrough and be ejected through downstream openings. Boerner also has a series of ridges in the walls and suffers the same problem that McCullough suffers in that the small vortex created behind each ridge which increased the overall drag. Boerner also suggests fluid driving means be provided between the upstream and downstream openings for providing further thrust, which is necessary to overcome the added drag.

In U.S. Pat. No. 2,608,171, in the name of I. H. Pearce and entitled "Corrugated Air Distributing Underbody For Water Borne Vessels", there is suggested the addition of longitudinal ribs to the outer surface of a water craft and the introduction of air between the ribs to maintain the water remote from the hull of the craft. This structure does in fact assist in reducing drag to a limited extent, but fails to take into account all of the various causes for drag. In U.S. Pat. No. 2,800,291, in the name of A. V. Stephens and entitled, "Solid Boundary Surface For Contact With A Relatively Moving Fluid Medium", it is suggested that triangular projections extend upward in a downstream direction for the purpose of delaying or preventing the separation of the fluid flowing around an airfoil. While the structure suggested by Stephens may accomplish its intended purpose of delaying the separation, it does not sufficiently delay the separation to the end of the airfoil.

In U.S. Pat. No. 2,899,150, in the name of F. E. Ellis, Jr. and entitled, "Bound Vortex Skin", the inventor suggests providing a series of spanline longitudinal cylindrical grooves along the wing of an airplane for the purpose of providing additional lift. This structure, however, greatly increases the drag with a net negative effect. In U.S. Pat. No. 3,184,184, in the name of H. A. Dorman et al and entitled, "Aircraft Having Wings With Dimpled Surfaces", dimples, such as found on a golf ball, are provided on the wings of an aircraft for the purpose of reducing drag. Unfortunately, these dimples do not reduce drag in an airfoil in the same manner as they allow a golf ball to rise, as contemplated by Dorman et al, because the airfoil does not spin as does a golf ball. U.S. Pat. No. 3,213,819, in the name of G. May and entitled, "Boundary Layer Control Assembly", apparatus and a technique to fabricate ribbon having periodic notches therein is disclosed for the purpose of fabricating porous skins for devices subject to relative fluid flow.

In U.S. Pat. No. 4,284,302, in the name of H. F. P. Drews and entitled, "Driven Craft Having Surface Means For Increasing Propulsion Efficiencies", a pattern of pointed upward extensions of various types are shown on an automobile for the purpose of reducing drag. This structures suffers the same problems as McCullough, discussed above. In U.S. Pat. No. 4,354,648, in the name of K. M. Schenk et al and entitled, "Airstream Modification Device", a series of spanline extension elements are placed on the surface of an airfoil for introducing multi-directional turbulence for the purpose of delaying the airstream separation from the airfoil. While the Schenk et al structure accomplishes what it intends, it does so by increasing turbulence and hence drag. In U.S. Pat. No. 4,434,957, in the name of R. R. Moritz and entitled "Low Drag Surface", an airfoil having a surface configuration to produce a vortex and control the subsequent movement of that vortex for the purpose of reducing drag is suggested. While this was a popular theory several years ago, no evidence exists to support the Moritz theory and in fact, it simply does not produce any beneficial results.

In U.S. Pat. No. 4,650,138, in the name of R. D. Grose and entitled, "Cascaded Micro-Grove Aerodynamic Drag Reducer", an airfoil is disclosed having streamline directed grooves therein, including micro-grooves within each of the grooves. In this regard, the Grose structure is similar to the Pearce structure, and does provide some benefit in reducing drag, but does not take into account the other factors necessary to better reduce drag. In U.S. Pat. No. 4,750,693, in the name of G. Löbert et al and entitled, "Device For Reducing The Frictional Drag Of Moving Bodies", a series of spanline microgrooves are provided to reduce drag on an airfoil. This structure does reduce drag to a limited extent, but it is very difficult to place a series of 0.3 micron grooves throughout the surface of an airplane or boat hull. Thus, the Löbert et al structure is not very practical.

Thus, none of the inventions described in the prior art patents operates to sufficiently reduce drag in a surface having fluid flowing thereacross, as indicated by the lack of widespread use of such inventions. One mistake of the prior art patents is that no single structure deformity is useful in all circumstances to adequately reduce drag. As noted above, drag relates to the viscosity of the fluid and the relative velocity of the fluid with respect to the object. However, drag also relates to the turbulence caused by the object relative to the moving fluid. Thus, one way to reduce drag is to reduce the turbulence created by the object.

SUMMARY OF THE INVENTION

In accordance with one aspect of this invention there is provided a low drag element in the presence of a fluid where there is relative fluid flow between said element and said fluid. The element includes a nonsmooth surface, approximating a minimal surface, which satisfies the equation $(\vec{V}\cdot\nabla)\nabla\Phi=0$, where $\vec{V}$ is the relative velocity between the fluid and the surface, $\nabla\Phi$ is the velocity of the strain tensor.

BRIEF DESCRIPTION OF THE DRAWINGS

One preferred embodiment of this invention is hereafter described with specific reference being made to the following Figures, in which.

FIG. 7 illustrates an enlarged view of a different diamond element shown in the array of FIG. 1;

FIG. 8 illustrates a cross sectional view taken across lines 8—8 of FIG. 7;

FIG. 9 illustrates a different type of surface partially satisfying the requirements of the subject invention and useful with accelerating flow with low turbulence;

FIG. 10 shows another surface providing some beneficial effect in reducing drag; and FIG. 11 illustrates an airfoil using the arrays of FIGS. 5 and 9 or FIGS. 10 and 9.

DETAILED DESCRIPTION OF A PREFERRED EMBODIMENT

Figure 1:
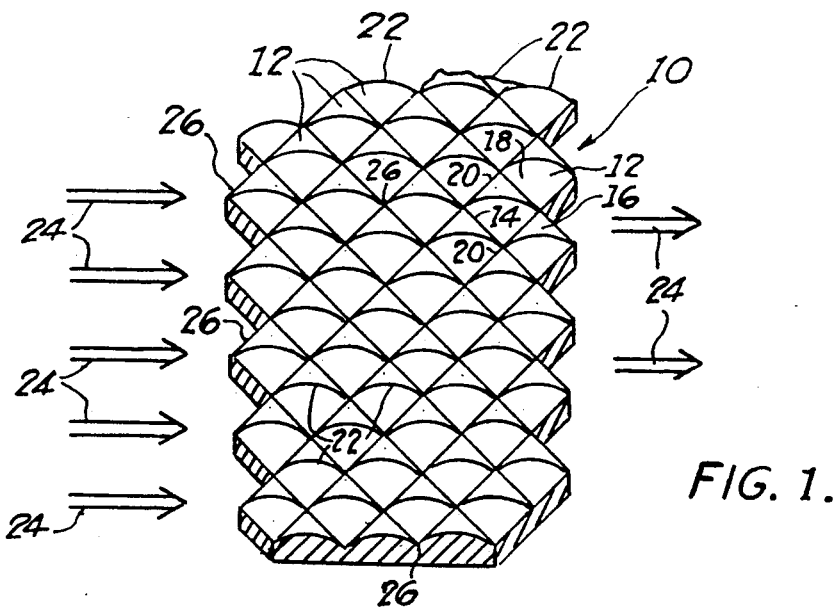
FIG. 1 illustrates a surface utilizing an array of diamonds satisfying the requirements of the subject invention.

In the past, the inventor hereof has published his findings of the mathematical formula for dynamic fluid flow, as the change in the velocity vector of a flowing fluid over a surface, and this formula considers both laminar flow and turbulent flow. See, Gao Ge, *On The Perturbation Equation Of Navier-Stokes Equation*, Journal Of Aerospace Power, Vol. 4, No. 2 Pages 189-192 (April 1989). This equation is:

$$D\vec{V}/Dt = -\nabla P/p + \nu\nabla^2\vec{V} + (V\cdot\nabla)\nabla\Phi + \tfrac{1}{2}(\vec{\Omega}\times\vec{\delta r}\cdot\nabla)\nabla\Phi + (\nabla\Phi\cdot\nabla)\nabla\Phi + \nu\nabla^2(\nabla\Phi) - \tfrac{1}{2}\nu(\delta r\cdot\nabla)\nabla\times\vec{\Omega}$$

where the operator $\nabla^2$ is the LaPlace operator, and where $\vec{V}$ is the relative velocity between a structure and its environmental fluid; p is the density of the fluid; $\vec{\Omega}$ is the vorticity of the fluid; P is the pressure of the fluid; $\nu$ is the kinematic viscosity; $\vec{\delta r}$ is the perturbation displacement; and $\nabla\Phi$ is the velocity of the strain tensor.

From this equation, it is seen that fluid dynamics is very complex and not easily modeled physically. However certain portions of the above noted equation can be ignored in attempting to model structure in which the drag is minimized. Specifically, the first two portions of the equation, that is $\nabla P/p$ and $\nu\nabla^2\vec{V}$ relate to laminar flow and do not have an impact on turbulent drag. Further, the fourth and fifth terms of the equation, that is $\tfrac{1}{2}(\vec{\Omega}\times\vec{\delta r}\cdot\nabla)\nabla\Phi$ and $(\nabla\Phi\cdot\nabla)\nabla\Phi$, are so small as to be negligible at any reasonable speed. The remaining parts of the above equation relate to turbulence and are useful to minimize drag if they can be minimized. Thus, in order to reduce drag, the following three conditions should be met:

$$\nabla^2(\vec{\Omega}\times\vec{\delta r})=0 \quad (1)$$

$$\nabla^2(\nabla\Phi)=0 \quad (2)$$

$$(V\cdot\nabla)\nabla\Phi=0 \quad (3)$$

Equation (1) requires that the direction of the streamline and the vortex filament must coincide with each other. This explains why the structure of the Pearce and Grose patents, noted above, provides some benefit in reducing drag. By providing grooves in an object in a relative flowing fluid, such as a boat hull in water or a flying aircraft, the streamline becomes aligned with the vortex filament and this component of the drag is reduced.

The present invention involves the additional utilization of Equations (2) and (3) above in order to design surface structure resulting minimal drag in the flowing fluid. Specifically Equation (2) suggests that the harmonic vector $\nabla\Phi$ is a conformal map onto a minimal surface and Equation (3) determines the specific shape of the necessary minimal surface. Thus, the surface of the object in the flowing fluid must be a map of minimal surface elements satisfying the shape requirements of Equation (3). In order to satisfy this criteria, the shape may vary depending upon different boundary conditions, such as whether the air flow is accelerating, decelerating and whether the flow is of a high turbulence or a low turbulence. Examples of various shapes satisfying the criteria of this invention hereafter follow, it being understood that this is not an inclusive set of examples.

Referring now to FIG. 1, a surface 10 is shown having an array of individual diamond shaped elements 12 formed thereon. Elements 12 may be formed by embossing surface 10 as taught herein or by applying a thin layer of material formed into the array of elements 12 over a conventional smooth surface. The specific shape of each of elements 12 satisfies the basic requirements of equations (2) or (3) above and placing them into an array satisfies the requirements of equations (1). The basic requirement of Equation (2) is that the surface area of each element is in the form of a minimal surface. As is well known, a minimal surface is a surface having an average curvature at every point of zero. For example, if a surface has a convex curve in one direction, it must have a corresponding concave curve in another direction in order to be a minimal surface. A minimal surface may be determined by building a frame and dipping the frame in a soapy solution. The resulting soap film attached to the frame upon removal from the soap solution represents the shape of a minimal surface because the surface tension causes the soap film to contract as much as possible.

Each of the elements 12 has four generally equal sides 14, 16, 18 and 20 forming a diamond figure on a generally planar base. The four sides are connecting to form four angles and a diagonal edge 22 connects two of the four angles in the direction of the fluid flow, as indicated by arrows 24. It should be understood that when fluid flow is referred to herein, the term is meant in a relative sense, that is, there is a relative difference in velocity between surface 10 an the fluid, whether it be a gas, such as air, or a fluid, such as water. Generally, the fluid is not flowing, but rather the surface is subjected to forces that cause it to move through the fluid. For example, an airplane moving through air or a boat moving through water are the driven objects and the relative movement of the air against the airplane or the water against the boat is referred to as fluid flow, even though the air or water may in fact have virtually zero velocity relative to earth.

The angle facing, or upstream from, the fluid flow is the apex angle 26. The diagonal edge 22 is shaped generally as an air foil and thus the diamond 12 takes on a three dimensional surface shape. In other words, diamond 12 is a nonsmooth surface. While the general shape of each diamond 12 has been described above with respect to FIG. 1, certain other shape characteristics of each diamond will depend upon its placement on surface 10 and the type of fluid flow over such placement. Thus, the specific shape should satisfy the requirements of Equation (3) above and that will depend upon the velocity gradient (acceleration and amount of turbulence) of the flowing fluid.

Figure 2:
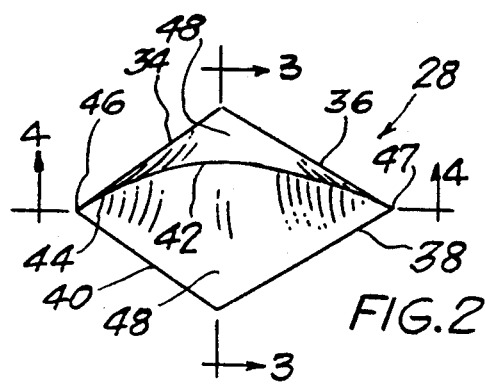
FIG. 2 illustrates an enlarged view of one type of diamond elements shown in the array of FIG. 1 and useful for a surface having decelerating flow thereacross.
Figure 3:
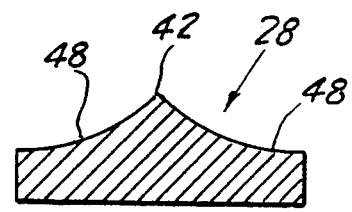
FIG. 3 illustrates a cross sectional view taken across lines 3—3 of FIG. 2.
Figure 4:
FIG. 4 illustrates a cross sectional view taken across lines 4—4 of FIG. 2.
Figure 6:
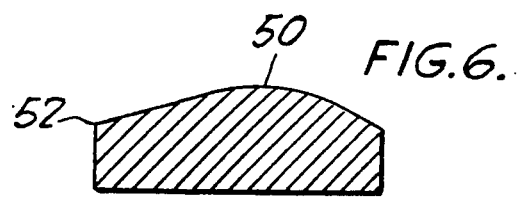
FIG. 6 illustrates a cross sectional view taken across lines 6—6 of FIG. 5.
Figure 5:
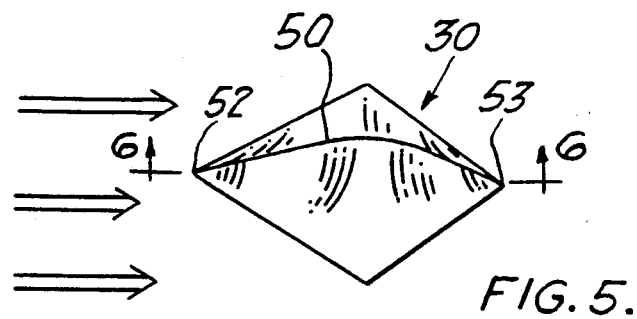
FIG. 5 illustrates an enlarged view of a different type of the diamond element shown in the array of FIG. 1 and useful for a surface having an accelerating flow with high turbulence intensity or equal velocity flow.

For example, the specific shape of a direct diamond element 28 for decelerating fluid flow is shown in FIGS. 2, 3 and 4, whereas the specific shape of a reverse diamond element 30 for an accelerating fluid flow with high turbulence intensity or equal velocity flow is shown in FIGS. 5 and 6. Further, a grooved diamond element 32 better satisfying equation (1), as well as equations (2) and (3) is shown in FIGS. 7 and 8. While these diamond configurations are exemplary, they are by no means the only configurations which could be used to obtain a reduction of drag.

Referring now to FIGS. 2, 3 and 4, where direct diamond 28 is shown and includes four sides 34, 36, 38 and 40, a diagonal edge 42 and an apex angle 44, similar to the diamond elements 12 in the array seen in FIG. 1. As previously noted, diamond element 28 has a shape determined by equation (3) for a decelerating fluid flow. Sides 34, 36, 38 and 40 are positioend generally on the same plane, or at least on the base surface upon which the array of diamonds 28 is to be placed. Such base, for example, may be an airplane wing or a boat hull and each may have a slightly curved surface. Diagonal edge 42 is a convex curve and shaped generally like an airfoil and is directed to extend along the streamline. Concave surfaces extends from diagonal edge 42 to each of the sides 34, 36, 38 and 40 such that direct diamond 28 has a minimal surface.

The distinguishing feature of direct diamond element 28 is that the peak of diagonal edge is positioned to be in the upstream half of direct diamond 28 and preferably between thirty and forty percent of the way between the upstream apex 46 and the downstream apex 47. Further, the angle of upstream apex 46 is equal to or less than ninety degrees. Including these features permits the direct diamond to satisfy equations (2) and (3) for a relative fluid flow which is decelerating. For example, an array of diamond elements 28 may be used on the rear of the fuselage or the rear forty to sixty percent of the wing of a conventional airplane, or on the stern of a ship hull, on the rear of a compressor blade, or on the surface of an air diffuser.

In addition, an array of diamond elements 28 has the effect of delaying the boundary layer separation between the flowing fluid 24 and the surface on which the array of diamond elments 28 is present because the velocity gradient near the surface is smaller than the velocity profile of a smooth surface. This presents an added advantage to the use of an array of diamond elements 28 beyond reducing drag.

Referring now to FIGS. 5 and 6, a reverse diamond element 30 is shown having generally the same structure as direct diamond element 28. Reverse diamond element 30 has a diagonal edge 50 and an apex 52 which constitute the only differences between reverse diamond element 30 and direct diamond element 28. Specifically, the peak of diagonal edge 50 is in the downstream half thereof and preferably between sixty and seventy percent of the way between the upstream apex 52 and the donwstream apex 53. The other difference is that the angle of apex 52 is equal to or greater than ninety degrees.

With these two changes, diamond element 30 becomes particularly useful for accelerating flow having a high amount of turbulence or equal velocity flow. As used herein, high turbulence is turbulence having a turbulence intensity above approximately one percent. Specifically, an array of diamond elements 30 are useful on surfaces such as the front upper surface of a blade of a compressor, or the front upper surface of a flap or the middle fuselage of an airplane.

Referring now to FIGS. 7 and 8, a grooved diamond element 32 is shown, which may be constructed as either direct diamond element 28 or reverse diamond element 30 as far as the position of the peak of the diagonal edge 54 is concerned. The difference between grooved diamond element 32 and the previously described diamond elements 28 and 30 is the addition of several grooves 58 which are positioned to be generally parallel to diagonal edge 54. The addition of grooves 58 permits the diamond element 32 to better satisfy equation (1) above, and thus, better align any vortex filaments with the streamline.

In the diamond elements shown in FIGS. 2, 5 and 7, the size of the diamond element 28, 30 and 32 sides may vary by a relatively large amount. For example, the sides, such as sides 34, 36, 38 and 40, may have a length from about one millimeter to several centimeters, as long as the other criteria discussed above are met, that is the surface approximates a minimal surface and the peak of the diagonal is properly positioned depending upon the acceleration or deceleration at the particular point.

Referring now to FIG. 9, a different type of array 60 is shown which generally satisfies equations (2) and (3) above. Array 60 includes a plurality of identical wavelets 62, 44, and 66 juxtaposed to one another and having a curved surface in both the spanline and streamline directions, whereby the result approximates a minimal surface. The spanline curve may be made to be generally sinusoidal or quasi sinusoidal in shape, although other periodic shapes may be used. The streamline curve is similar to the diagonal edge 50, shown in FIG. 5, that is, the streamline curve is similar to an airfoil and has a maxima at approximately sixty to seventy percent between the upstream and downstream edges of the wavelet. The width of each wavelet 62, 64 and 66 may be selected to approximately equal to the period of the spanline waveform, which again may vary from a millimeter to several centimeters. However, the ratio of the width to period may also vary over a large range, so long as approximately a minimal surface is present.

The wavelet array 60 shown in FIG. 9 is particularly useful for accelerating fluids having a low amount of turbulence. Specifically, such low turbulence should have a turbulence intensity below one and one half percent. The wavelet array 60 may be used, for example, on the front thirty percent of the fuselage or the front forty to sixty percent of the upper wing of an airplane, or the port of a ship hull.

Referring now to FIG. 10, a different surface 68 is shown containing a plurality of diamond shaped grooves 70 on an otherwise smooth surface, such as an airplane wing. Grooves 70 are positioned to form an array of diamond elements 72 which may have the apex angles as described above with respect to diamond elements 28, 30 and 32. Even though the FIG. 10 structure 68 does not specifically satisfy the equations (1), (2) or (3) above because the surface between grooves 70 is generally flat, it still approximates a solution because a flat surface approximates a minimal surface. However, the structure 68 shown in FIG. 10 does generally satisfy equation (3) and thus, some improvement in reducing drag is provided.

Referring now to FIG. 11, an airplane wing 74 is shown and has an array 76 of wavelets, such as shown in FIG. 9, on the upstream portion and an array 78 of diamonds, such as shown in one of FIGS. 5 or 10, on the downstream portion. The use of wavelet array 76 is preferable to the use of the diamond array, such as shown in FIG. 2, because the intensity of the turbulence at the upstream portion of airplane wing 74 is low. In other circumstances, however, the wavelet array may be replaced by a diamond array, such as shown in FIG. 5, where a high turbulence intensity is present.

What is claimed is:

1. A low drag element in the presence of a fluid where there is relative fluid flow between said element and said fluid, said element comprising:

a nonsmooth surface, approximating a minimal surface, which satisfies the equation $(\vec{V}\cdot\nabla)\nabla\Phi=0$, where $\vec{V}$ is the relative velocity between the fluid and the surface, $\nabla\Phi$ is the velocity of the strain tensor.

2. The invention according to claim 1 wherein said surface includes a plurality of spanning wavelets juxtaposed to one another on said surface in the portion thereof having accelerating fluid flow with low turbulence.

3. The invention according to claim 2 wherein said surface includes a plurality of diamond shapes on the portion of said surface having decelerating flow.

4. The invention according to claim 3 wherein said surface includes a plurality of diamond shapes on the portion of said surface having accelerating flow and high turbulence.

5. The invention according to claim 2 wherein said surface includes a plurality of diamond shapes on the portion of said surface having accelerating flow and high turbulence.

6. The invention according to claim 1 wherein said surface includes a plurality of diamond shapes on the portion of said surface having accelerating flow and high turbulence.

7. The invention according to claim 6 wherein said surface includes a plurality of diamond shapes on the portion of said surface having decelerating flow.

8. The invention according to claim 1 wherein said surface includes a plurality of diamond shapes on the portion of said surface having decelerating flow.

9. The invention according to claim 1 wherein said nonsmooth surface is positioned in said fluid to permit the direction of the vortex filament and streamline to be parallel.

10. The invention according to claim 9 wherein said surface includes a plurality of spanning wavelets juxtaposed to one another on said surface in the portion thereof having accelerating fluid flow with low turbulence.

11. The invention according to claim 10 wherein said surface includes a plurality of diamond shapes on the portion of said surface having decelerating flow.

12. The invention according to claim 11 wherein said surface includes a plurality of diamond shapes on the portion of said surface having accelerating flow and high turbulence.

13. The invention according to claim 10 wherein said surface includes a plurality of diamond shapes on the portion of said surface having accelerating flow and high turbulence.

14. The invention according to claim 9 wherein said surface includes a plurality of diamond shapes on the portion of said surface having accelerating flow and high turbulence.

15. The invention according to claim 14 wherein said surface includes a plurality of diamond shapes on the portion of said surface having decelerating flow.

16. The invention according to claim 9 wherein said surface includes a plurality of diamond shapes on the portion of said surface having decelerating flow.

17. A surface, which in the presence of a flowing fluid, results in lower drag than a smooth surface comprising:

a plurality of simultaneous spanwise and streamwise wavelets juxtaposed to one another on said surface in the portion thereof having accelerating fluid flow with low turbulence.

18. The invention according to claim 17 wherein said wavelets have a nonlinear shape in both the streamwise and spanwise directions.

19. The invention according to claim 18 wherein said wavelets have a convex profile with a maxima in the half thereof downstream from said flowing fluid.

20. The invention according to claim 18 wherein each of said wavelets have a streamwise varying sinusoidal like shape along the span of said surface.

21. The invention according to claim 19 wherein each of said wavelets have a streamwise varying sinusoidal like shape along the span of said surface.

22. A surface, which in the presence of a flowing fluid, results in lower drag than a smooth surface comprising:

a plurality of diamond shapes on the portion of said surface having decelerating flow;

wherein said diamond shape has four legs arranged on a plane and a convex diagonal edge between opposite corners formed by said legs, said diagonal edge having a maxima in the half of said diamond upstream from said flowing fluid.

23. The invention according to claim 22 wherein said maxima is at between thirty and forty percent of the diagonal edge length, as measured from the direction thereof facing said flowing fluid.

24. The invention according to claim 23 wherein the surface between said convex diagonal edge and said four legs is approximately a minimal surface.

25. The invention according to claim 24 wherein said legs are each straight and the apex angle facing said flowing fluid formed between two adjacent legs is not greater than ninety degrees.

26. The invention according to claim 23 wherein the surface between said convex diagonal edge and said four legs is approximately a minimal surface.

27. The invention according to claim 23 wherein said legs are each straight and the apex angle facing said flowing flud formed between two adjacent legs is not greater than ninety degrees.

28. A surface, which in the presence of a flowing fluid, results in lower drag than a smooth surface comprising:
   a plurality of diamond shapes on the portion of said surface having accelerating flow and high turbulence;
   wherein said diamond shape has four legs arranged on a plane and a convex diagonal edge between opposite corners formed by said legs, said diagonal edge having a maxima at a position in the half of said diamond downstream from said flowing fluid.

29. The invention according to claim 28 wherein said maxima is at between thirty and forty percent of the diagonal edge length, as measured from the direction thereof facing away from said flowing fluid.

30. The invention according to claim 29 wherein the surface between said convex diagonal edge and said four legs is approximately a minimal surface.

31. The invention according to claim 30 wherein said legs are each straight and the apex angle facing said flowing fluid formed between two adjacent legs at least ninety degrees.

32. The invention according to claim 28 wherein the surface between said convex diagonal edge and said four legs is approximately a minimal surface.

33. The invention according to claim 28 wherein said legs are each straight and the apex angle facing said flowing fluid formed between two adjacent legs is at least ninety degrees.

34. A surface, which in the presence of a flowing fluid having a certain streamline, results in lower drag than a smooth surface comprising:
   a plurality of intersecting grooves formed in said surface, said grooves being generally straight and skewed to said streamline to form an array of adjacent diamond shapes on said surface between said grooves.

35. The invention according to claim 34 wherein said grooves are divided into two groups of grooves, each group being skewed to said streamline by opposite sign angles and each groove of one group intersecting a plurality of grooves of the other group.

36. The invention according to claim 34 wherein said grooves are divided into two groups of parallel grooves, each group being skewed to said streamline by opposite sign angles and each groove of one group intersecting a plurality of grooves of the other group.

* * * * *